United States Patent
Zang et al.

[11] Patent Number: 5,838,439
[45] Date of Patent: Nov. 17, 1998

[54] HETERODYNED SELF-MIXING LASER DIODE VIBROMETER

[76] Inventors: De Yu Zang, 11 Lassen, Irvine, Calif. 92612; James E. Millerd, 65 Cottage La., Aliso Viejo, Calif. 92656

[21] Appl. No.: 818,310

[22] Filed: Mar. 14, 1997

[51] Int. Cl.$^6$ ....................................................... G01B 9/02
[52] U.S. Cl. ........................................... 356/349; 356/358
[58] Field of Search ................................... 356/349, 28.5, 356/28, 345, 358

[56] References Cited

U.S. PATENT DOCUMENTS

| | | | |
|---|---|---|---|
| 4,554,836 | 11/1985 | Rudd | 73/657 |
| 4,669,876 | 6/1987 | Dopheide | 356/28.5 |
| 4,919,532 | 4/1990 | Mocker et al. | 356/4.5 |
| 4,928,152 | 5/1990 | Gerardin | 356/5 |
| 5,114,226 | 5/1992 | Goodwin et al. | 356/358 |
| 5,394,233 | 2/1995 | Wang | 356/5.01 |
| 5,412,474 | 5/1995 | Reasenberg | 356/4.09 |

OTHER PUBLICATIONS

H. Shinohara, et. al."Laser Doppler velocimeter using the self–mixing effect of a semiconductor laser diode," Applied Optics/vol. 25, No. 9, pp. 1417–1419 (May 1986).

S. Saito, et. al., "*Optical Heterodyne Detection Direct Frequency Modulated Laser Signal,*" Electron. Lett. 16, 826, 1980.

Dandrige and Goldberg, "Current–induced frequency modulation in diode lasers," Electronics Letters, vol. 18, No. 7, pp. (1982).

R. Lang and K. Kobayashi "External optical feedback effects on semiconductor injection laser properties," IEEE J. Quantum Electronics, vol.QE–16, No. 3, pp. 347–355 (Mar. 1980).

Valera and Farley "A high performance magnetic force microscope," Measurement Science & Technology, vol. 7, No. 1, p. 30 (1996).

*Primary Examiner*—Robert Kim

[57] ABSTRACT

This patent describes a new method for remotely measuring vibration of an object based on laser Doppler vibrometry. The method combines an external two-pass frequency shifting technique with self-mixed, heterodyne detection to provide a compact measurement system that requires only three optical components. A standard diode laser package, consisting of a laser and a monitor photodiode, is used to emit light and detect the scattered signal, a lens is used to collimate the light, and an external modulator is used to shift the optical frequency. The diode laser may be used with or without temperature stabilization. The unique design permits the measurement of objects from a range of long distances without the need for focusing or alignment. Measurements made with the system are characterized by high signal-to-noise ratio, wide dynamic range, and simple alignment.

23 Claims, 10 Drawing Sheets

HETERODYNED SELF-MIXING LASER DIODE VIBROMETER

This patent describes a new method for remotely measuring vibration of an object based on laser Doppler vibrometry. The method combines an external two-pass frequency shifting technique with self-mixed, heterodyne detection to provide a compact measurement system that requires only three optical components. A standard diode laser package, consisting of a laser and a monitor photodiode, is used to emit light and detect the scattered signal, a lens is used to collimate the light, and an external modulator is used to shift the optical frequency. The unique design permits the measurement of objects at a long range of distances without the need for focusing or alignment. Measurements made with the system are characterized by high signal-to-noise ratio, wide dynamic range, and simple alignment.

BACKGROUND—FIELD OF THE INVENTION

The present invention relates to vibration measurements using noninvasive, non-contact and nondestructive techniques, namely, a coherent laser beam is used as a probe to measure the vibration of an object.

BACKGROUND—DESCRIPTION OF PRIOR ART

Laser Doppler vibrometry (LDV) is a well-established non-contact method to measure the vibration of an object. LDV has been intensively investigated and forms the basis of various commercial instruments; however, the existing LDV instruments have commonly suffered from a bulky size, high cost and are difficult to use. LDV is based on the use of an interferometer to detect the Doppler frequency-shift in optical signals induced by vibrations of an object. An interferometer mixes a coherent reference and a probe beam at a detector and requires precise overlap of the two beams. For vibrometry, heterodyne detection using frequency shifting or quadrature techniques is necessary to overcome: a) harmonic doubling that occurs when the target is located a multiple number of optical wavelengths from the target, b) non-linearities that occur at vibration amplitudes on the order of the optical wavelength and c) a low signal-to-noise ratio caused by sensitivity to laser intensity fluctuations. Conventional LDV instruments use mirrors and beamsplitters to achieve the overlap of the two beams; acousto-optic modulators or polarization elements are used to accomplish heterodyne detection. This requires precision components and a complicated alignment procedure that results in an expensive instrument which is difficult to use.

Wang et. al. U.S. Patent No. 5,394,233 describes an adaptation of the conventional LDV instrument; however, the design still requires precise alignment of three mirrors, two lenses and a beamsplitter in order to operate. Self-mixing has been proposed and demonstrated as a method to greatly simplify the design and alignment of interferometers (Lang and Kobayashi). Shinohara et. al. demonstrated a compact laser vibrometer using self-mixing; however, they did not incorporate heterodyne detection and as a result had a poor signal-to-noise ratio caused by inherent sensitivity to laser intensity noise, and generated higher order harmonics that were dependent on target position and vibrational amplitude. Gerardin U.S. Patent No. 4,928,152 incorporated a heterodyne detection scheme with self-mixing by using current-frequency modulation of a laser diode (Dandrige and Goldberg). Gerardin's method was primarily for measuring the distance to a target but could be used for measuring vibration. Applying current-frequency modulation for vibration measurements causes two problems: higher order harmonics due to laser intensity modulation and an unstable heterodyne carrier frequency that is dependent on target position. The current-frequency modulation and self-mixing technique is attractive because it can measure object vibration and position simultaneously, but this technique is flawed in practice because it creates many extra and high order harmonic frequencies which adversely affect measurement accuracy.

Rudd U.S. Patent No. 4,554,836 describes a laser vibrometer that uses heterodyne detection but does not incorporate self mixing. The vibrometer has a small working distance and requires the precise alignment of an external detector.

A differential heterodyne detection technique developed for a magnetic force microscope (Valera and Farley) has limited applications since it can only measure differential vibration between two closely spaced probe beam positions.

OBJECTS AND ADVANTAGES

Accordingly, several objects and advantages to our invention are:

a) to provide an instrument that can be used by untrained personnel;
b) to provide an instrument that can be operated over long distances without alignment;
c) to provide an instrument that is compact;
d) to provide an instrument that is low cost;
e) to provide an instrument that has a high optical detection sensitivity which enables the system to detect low light levels from diffuse reflecting targets;
f) to provide an instrument that has a high degree of immunity to optical intensity noise generated both internally and externally to the laser;
g) to provide an instrument that has a wide measurement dynamic range with respect to vibration frequency and amplitude;
h) to provide an instrument that is easy to manufacture and align;
i) to provide an instrument that has a high signal-to-noise ratio (>60 dB); and
j) to provide an instrument that has good harmonic rejection;
k) Further objects and advantages of our invention will become apparent from a consideration of the drawings and ensuing description.

DRAWING FIGURES

FIG. 10a to 10d are Fourier power spectrums obtained with the measurement apparatus of FIG. 2 that employed a 200 KHz frequency shifting element.

REFERENCE NUMERALS IN DRAWINGS

Figure 1:
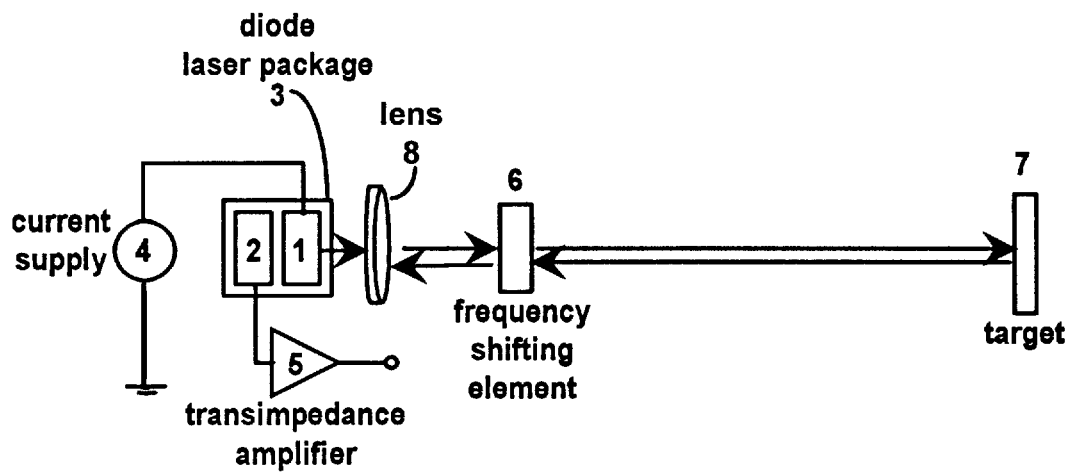
FIG. 1 depicts a conceptual configuration of the laser vibrometer according to the present invention.

1. Diode laser.
2. Photodetector.
3. Diode laser package.
4. Laser power supply.
5. Transimpedance amplifier.
6. Frequency shifting element.
7. Target.
8. Lens.
9. Vibrometer laser head.
10. Electronics box.
11. Computer for analysis of data.
12. Electronics box connector 1.
13. Electronics box connector 2.
14. Electronics box connector 3.
15. Electronics box connector 4.
16. Electronics box connector 5.
17. Laser head connector 1.
18. Laser head connector 2.
19. Laser head connector 3.
20. Laser head connector 4.
21. Acousto-optic modulator 1.
22. Acousto-optic modulator 2.
23. Probe beam.
24. Electrical power supply 1.
25. FM demodulation unit.
26. Electrical power supply 2.
27. RF driver 1.
28. RF driver 2.
29. Analog to digital conversion board.
30. Data processing software.
31. Incident laser beam.
32. Undiffracted laser beam.
33. Reflected probe beam.
34. Undiffracted reflected probe beam.
35. Diffracted reflected probe beam.
36. Sound field 1.
37. Sound field 2.
38. Diffracted beam 1.
39. Undiffracted beam 1.
40. Undiffracted beam 2.
41. Undiffracted return beam 1.
42. Diffracted return beam 1.
43. Undiffracted return beam 2.
44. Light inside laser cavity.
45. Amplified electrical return signal.
46. Phase locked loop demodulator.
47. Electrical frequency doubler.
48. Phasemeter.

DESCRIPTION—FIGS. 1–9

1) FIG. 1 depicts a conceptual configuration of the vibrometer according to the present invention. A standard laser diode package 3 contains a laser 1 and a photodetector 2. A laser power supply 4 is connected to diode laser 1. Photodetector 2 is connected to transimpedance amplifier 5. A lens 8, a frequency shifting element 6, and a target 7 are positioned along the optical axis of diode laser package 3.

Figure 2:
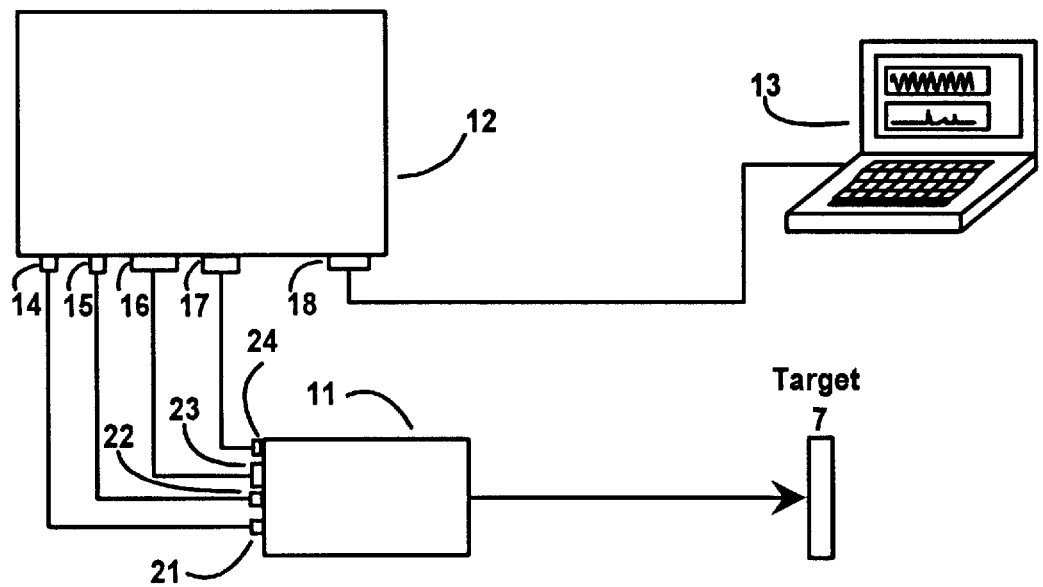
FIG. 2 is an overview of a measurement system employing a vibrometer according to the present invention.

2) FIG. 2 depicts the use of the vibrometer, according to the present invention, in a measurement system which consists of a laser head 11, electrical box 12, and a laptop PC computer 13 for processing and display of data. Connections between the electrical box 12 and the laser head 11 include: connector 14 wired to connector 21, connector 15 wired to connector 22, connector 16 wired to connector 23, connector 17 wired to connector 24.

Figure 3:
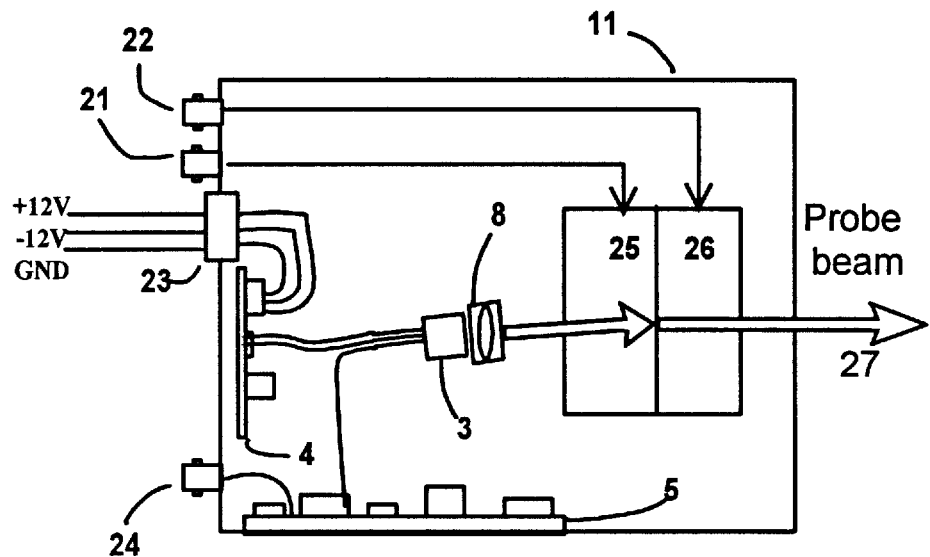
FIG. 3 is a detailed view of laser head 11 shown in FIG. 2.

3) FIG. 3 shows a detailed schematic view of an apparatus used as the laser head 11, according to the present invention. Connector 21 is wired to acousto-optic modulator 25. Connector 22 is wired to acousto-optic modulator 26. Connector 23 is wired to current supply 4 which is then wired to diode laser package 3. The photodetector 2 of diode laser package 3 is wired to transimpedance amplifier 5 and the output is wired to connector 24. Lens 8 is mounted close to laser diode package 3 and along the optical axis of diode laser package 3. The acousto-optic modulators 25 and 26 are also positioned along the optical axis of diode laser package 3.

Figure 4:
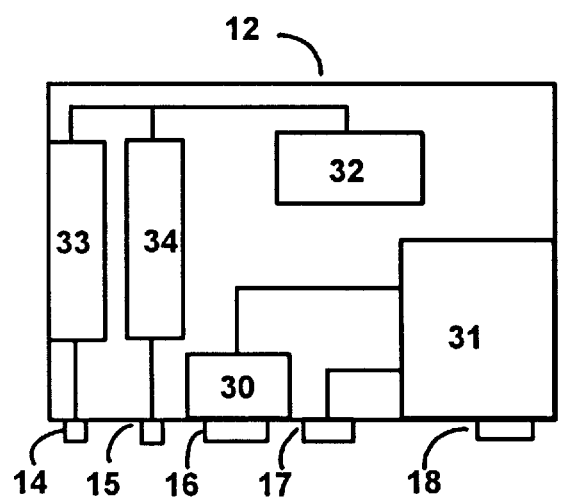
FIG. 4 is a detailed view of electronics box 12 shown in FIG. 2.

4) FIG. 4 shows a schematic view of an apparatus used as the electrical box 12 according to the present invention. Power supply 30 is wired to connector 16 and to an FM demodulation unit 31. Connector 17 is wired to FM demodulation unit 31. The output from FM demodulation unit 31 is wired to connector 18. Power supply 32 is wired to RF drivers 33 and 34 which are in turn wired to connectors 14 and 15, respectively.

Figure 5:
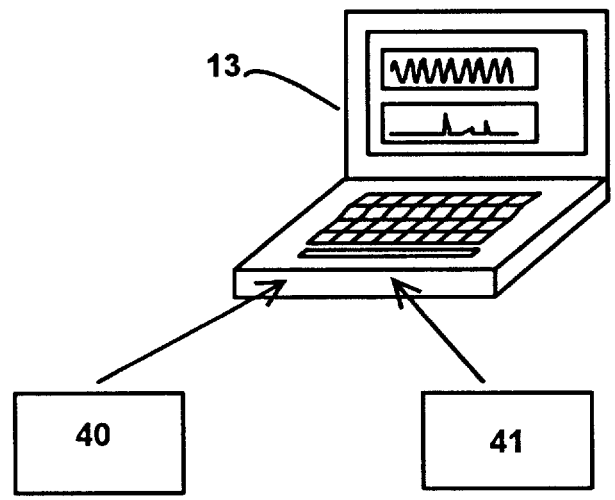
FIG. 5 is a detailed schematic view computer 13 shown in FIG. 2.

5) FIG. 5 is a diagrammatic view showing the PC computer 13 of FIG. 1 which contains an analog to digital data acquisition board 40 and data processing software 41.

Figure 6:
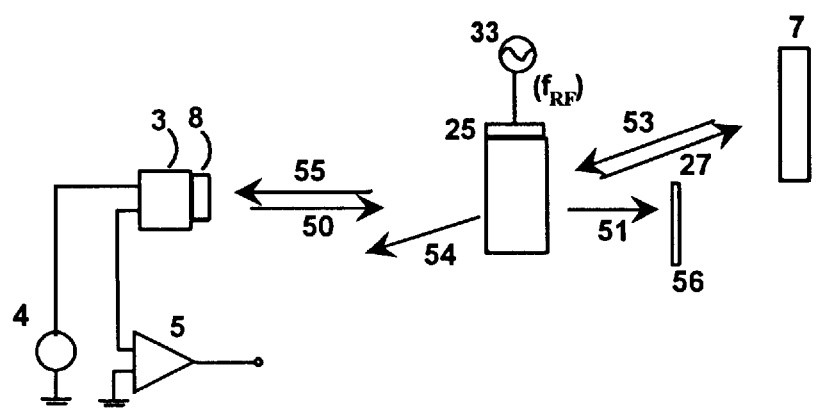
FIG. 6 is a schematic view illustrating operation of laser vibrometer.

6) FIG. 6 is a diagrammatic view of an apparatus for performing the vibrometer measurement according to the present invention. Current supply 4 is wired to diode laser package 3 which is also wired to transimpedance amplifier 5. Lens 8 is mounted close to diode laser package 3 to collimate the light. Acousto-optic modulator 25 is used as a frequency shifting element. A beam dump 56 is positioned to block undiffracted light.

Figure 7:
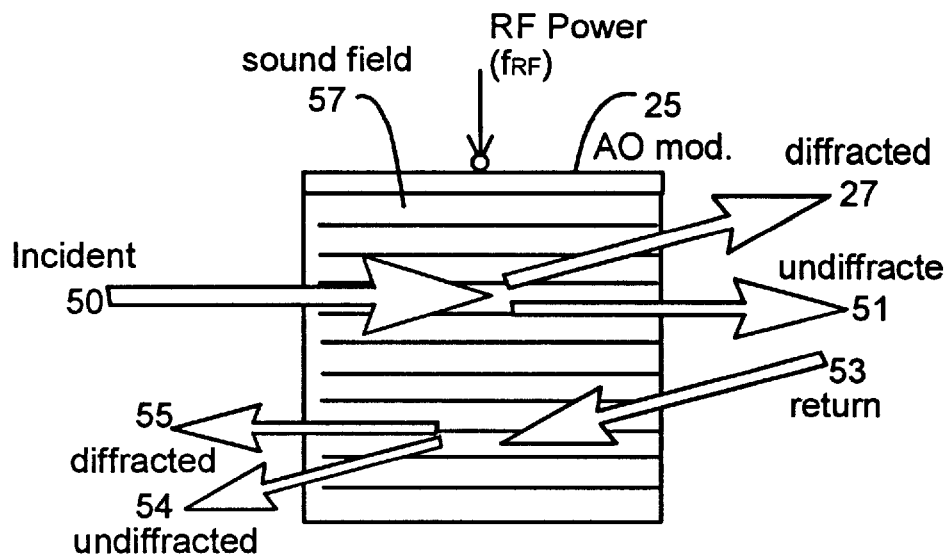
FIG. 7 is a detailed view illustrating operation of single acousto-optic modulator.

7) FIG. 7 is a diagrammatic view showing the how the acousto-optic modulator 25 is used to produce two frequency shifts of the light beam.

Figure 8:
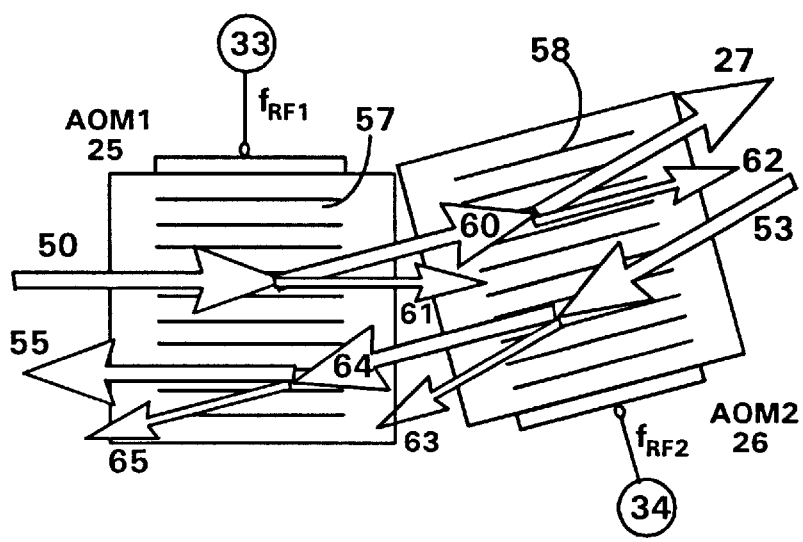
FIG. 8 is a detailed view illustrating operation of dual acousto-optic modulators.

8) FIG. 8 is a diagrammatic view showing how acousto-optic modulator 25 and acousto-optic modulator 26 can be used to produce an arbitrary net frequency shift which is equal to twice the difference in AO drive frequencies.

Figure 9:
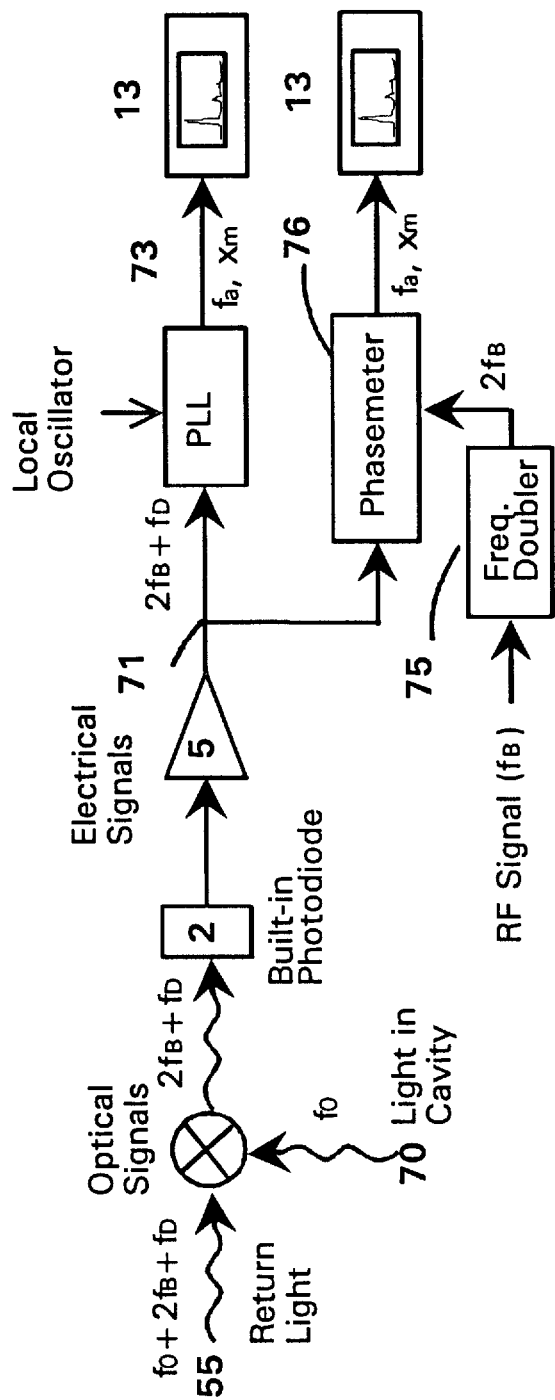
FIG. 9 is a schematic view illustrating how optical signals are combined, amplified and demodulated.

9) FIG. 9 is a diagrammatic view illustrating how return light 55 and light inside the laser cavity 70 are combined and how the electrical signal 71 is demodulated to obtain the target vibration frequency and amplitude according to the present invention. The photodetector 2 is wired to the transimpedance amplifier 5 which can be wired to either a phase locked loop demodulator 73 or a phasemeter 76. Phasemeter 76 requires input from a frequency doubler 75.

OPERATION—FIGS. 1–9

A. Overview.

FIG. 1 is a schematic view of a basic embodiment of the measurement apparatus according to the present invention. In FIG. 1 a fixed frequency shifting element 6 (FSE) is used with a common laser diode package 3 in a double pass, self-mixing configuration to produce a robust measurement technique that requires only a few components. An optical FSE such as an acousto-optic (AO) modulator (or a dual AO modulator) is placed directly in front of the laser diode package 3 to shift the optical frequency of the laser beam. The shifted beam strikes a vibrating target 7 and is further frequency modulated due to the Doppler effect. The frequency modulation due to the Doppler effect is proportional to the target velocity and thus, is time dependent for a vibrating surface. The beam is scattered in many directions; however, a portion of the optical beam is retro-reflected. The retro-reflected beam subsequently re-enters the FSE 6 and is shifted in frequency a second time. The light then couples back into the diode laser package 3 and mixes with light in the cavity to create a heterodyne beat signal. The beat signal is amplified in the laser cavity and the light emerging from the back of the cavity is detected by the built-in photodiode 2. The heterodyne signal consists of a carrier frequency, which is equal to twice the frequency of the FSE, that is frequency modulated by the time-dependent Doppler signal induced by the scattering interaction with the moving target. The Doppler signal can be readily decoded from the carrier signal using standard FM-demodulation techniques to provide a direct measure of the object velocity as a function of time. The demodulated FM signal has a frequency equal to the target vibration frequency and a magnitude that is proportional to the target vibrational amplitude multiplied by the vibration frequency. Thus, the vibrational frequency and amplitude characteristics of the object are measured.

The novelty of the invention is the double pass configuration of the FSE combined with self-mixing in the laser diode and the use of the built-in photodiode to detect the beat signal. The use of the FSE mitigates harmonic doubling that occurs when the object is placed an integer number of half wavelengths from the laser or when vibration amplitude is a substantial fraction of the optical wavelength. Use of the FSE also makes the detection circuitry immune to fluctuations in amplitude of the reflected light. The external FSE produces a stable, continuous frequency shift that is independent of target position, thus providing a significant improvement over the method of Geradin.

Self-mixing substantially increases the detection sensitivity to weak return light amplitude and thus permits operation with high F-number optics over a long range of standoff distance (distance between target and laser). Because the probe beam, scattered beam and reference beam all travel down a common axis, proper spatial overlap at the detector, which is mounted directly behind the diode laser, is achieved automatically. The overall configuration: significantly reduces the number of necessary optical components, results in an optical system that is easy to align, has a high signal-to-noise ratio, has good harmonic rejection, and permits operation over a long range of distances without the need to readjust the instrument.

B. Theoretical Basis of the Invention

FIG. 1 is a schematic of the basic embodiment of the present invention, called a laser vibrometer. A standard metal canned laser diode package 3 consists of a laser 1 and a photodetector 2 that is located directly behind laser 1. The photodetector 2 receives light exiting the rear of the laser cavity and is typically used to monitor the output power of laser 1. Laser 1 is powered by a constant current source 4 that is pre-programmed to operate at a nominal current specification. The coherent light beam emitted from laser 1 is collimated by a lens 8 and passes through a frequency shifting element 6 where it is shifted in optical frequency by an amount $f_B$. The frequency shifted light impinges on a diffusely reflecting target 7 and is scattered. The scattered light is frequency modulated due to the Doppler effect. The modulation frequency is proportional to the instantaneous velocity of the target. The Doppler frequency $f_d$ is given by:

$$f_d = 2V \cos \alpha/\lambda, \quad (1)$$

where V is the object velocity, $\lambda$ is optical wavelength, and $\alpha$ is the intersection angle between the light beam and object velocity direction. The time dependent position of a vibrating target can be written as $$X = X_m \cos(2\pi f_a t) \quad (2)$$

where $X_m$ is the vibrational amplitude, and $f_a$ is the vibration frequency. The time dependent velocity of the target is given by $$V = -X_m 2\pi f_a \sin(2\pi f_a t). \quad (3)$$

Substituting Equation (3) into Equation (1), the time dependent Doppler frequency shift, $f_d$, imparted on the scattered light beam is $$f_d = -4X_m \pi f_a \sin(2\pi f_a t) \cos \alpha/\lambda. \quad (4)$$

A portion of the scattered light is returned back through the frequency shifting element where it is further frequency shifted by an amount, $f_B$. The electric field of the scattered light beam before reentering the laser cavity can be written as:

$$E_s(t) = E_s \cos[2\pi(f_0 + f_d + 2f_B)t + \phi_1] = E_s \cos[2\pi(f_0 + 2f_B - 4X_m \pi f_a \sin(2\pi f_a t) \cos \alpha/\lambda) + \phi_1] \quad (5)$$

where $f_0$ is the optical frequency. The electric field of the laser light in the cavity is:

$$E_r(t) = E_r \cos[2\pi f_0 t + \phi_2]. \quad (6)$$

Mixing the scattered light with the laser beam in the cavity produces a beat signal at photodetector 2 which is built-in laser diode package 3. The optical intensity on photodetector 3 is given by:

$$I(t) = 2E_s E_r \cos(2\pi(2f_B + f_d) + \Delta\phi) = I \cos(2\pi f(t) + \Delta\phi) \quad (7a)$$

and $$f(t) = 2f_B + f_d = 2f_B - 4X_m \pi f_a \cos \alpha \sin(2\pi f_a t)/\lambda, \quad (7b)$$

where $\Delta\phi = \phi_2 - \phi_1$. The current generated in photodetector 2 is linearly proportional to intensity. A tuned transimpedance amplifier 5 is used to amplify the beat signal present at photodetector 2. The resulting signal is $$v(t) = I G \eta \cos(2\pi f(t) + \Delta\phi) \quad (7c)$$

$$v(t) = v_o \cos(2\pi f(t) + \Delta\phi), \quad (7d)$$

where G is the transimpedance gain of the amplifier, $\eta$ is the quantum efficiency of the detector, and $v_o = I G \eta$.

Equation (7b) shows that the detected LDV signal is a typical FM signal. Using an FM-demodulation technique, $2f_B$ is subtracted by an electronic heterodyne circuit, and the output signal is given by:

$$A(t) = (4X_m \pi f_a \cos \alpha/\lambda) \sin(2\pi f_a t). \quad (8)$$

Equation (8) shows that after FM-demodulation, the output signal contains only the vibration frequency, $f_a$ and its amplitude is proportional to a product of the vibration amplitude and frequency. As is typical with FM modulation, the demodulated signal is unaffected by the strength of the carrier signal, v(t), resulting in high signal-to-noise output signal.

FIG. 2 illustrates a vibration measurement apparatus that was constructed to validate the operation of the basic embodiment shown in FIG. 1. The key components in the system include: a laser head 11, electrical box 12, and a laptop PC computer 13 for processing and display of the data. Connectors 14 and 15 carry RF power to laser head 11, connector 16 carries DC voltage to laser head 11, and connector 17 delivers the output signal from laser head 11 to electrical box 12.

FIG. 3 shows a detailed schematic view of laser head 11 of FIG. 2. A laser beam emerging from a laser diode 3 is collimated by lens 8 and enters the acousto-optic modulators 25 and 26. The diffracted beam 27 is frequency-shifted by an amount $f_B$. Diffracted beam 27 is incident on an object and a portion of the scattered light is directed through acousto-optic modulators 25 and 26, through lens 8 and back into laser diode package 3. The laser diode is connected to laser power supply 4 which causes laser emission. The photodetector 2 is connected to a transimpedance amplifier 5 which provides a reverse bias voltage and amplifies the output current. Transimpedance amplifier 5 can be tuned to amplify only signals in a narrow frequency band centered at $2f_B$.

FIG. 4 shows a schematic view of an apparatus used as the electrical box 12 according to the present invention which consists of DC power supplies 30 and 32, RF drivers 33 and 34, and an FM demodulation unit 31. Decoding electronic unit 31 can use a phased locked loop or a phasemeter to perform an FM demodulation.

FIG. 5 is a diagrammatic view showing the computer 13 of FIG. 1 which contains an analog to digital data acquisition board 40 and data processing software 41.

FIG. 6 is a diagrammatic view of an apparatus used to validate the measurement method according to the present invention. Laser power supply 4 was used to drive diode laser and reverse bias the photodetector 2 in the laser package 3. The light beam emerging from the laser diode package 3 was collimated by lens 8 and directed into the acousto-optic modulator 25 where it is split into undiffracted 51 and diffracted 27 beams. Diffracted beam 27 was frequency-shifted by an amount $f_B$ and was incident on the target 7. The undiffracted beam was blocked by a beam block 56. Back-scattered light 53 from the target 7 traveled back through the AO modulator and was split into diffracted 55 and undiffracted 54 beams. Diffracted beam 55 incurred a second frequency shift, $f_B$, and was then coupled into diode laser package 3 where it combined with light in laser 1, produced a beat signal that was detected by built-in photodetector 2, and then was amplified by transimpedance amplifier 5.

FIG. 7 is a diagrammatic view showing how the AO modulator 25 of FIG. 6 was used to produce two frequency shifts of the light beam. Before entering the AO modulator 25, the optical frequency of the incident light beam 50 was equal to $f_0$. Incident light 50 was deflected by the sound field 57 that was generated by RF driver 33 at a frequency equal to $f_{RF}$ thus producing diffracted beam 27 having a frequency shift of $f_B$. A portion of the incident beam 50 passed straight through the AO modulator 25 and formed undiffracted beam 51 which had no frequency shift and was blocked by beam block 56. The reflected light from the target 53, which carries a Doppler shift equal to $f_D$, was deflected a second time in AO modulator 25 by the sound field 57 producing diffracted beam 55 and an undiffracted beam 54. Diffracted beam 55 was shifted in frequency a second time and had a net frequency equal to $f_0+2f_B+f_D$. The net frequency shift, $2f_B$, was equal to twice the RF drive frequency, $2f_{RF}$.

FIG. 8 illustrates how a dual AO modulator configuration was used to produce a net frequency shift significantly less than the AO modulator RF frequency. Typical RF frequencies fRF are in the range of 40–80 MHz, resulting in a net frequency shift $2f_B$ of 80–160 MHz. To permit usage of low frequency demodulation electronics two AO modulators were used at different frequencies. Acousto-optic modulators 25 and 26 were driven by RF drivers 33 and 34 operating at frequencies $f_{RF1}$ and $f_{RF2}$, respectively. Input beam 50 with optical frequency $f_0$ entered into acousto-optic modulator 25, and was diffracted by sound wave 57. The optical frequency of diffracted beam 60 was up-shifted to $f_0+f_{RF1}$. Diffracted beam 60 entered AOM2 26 and was diffracted a second time by a sound wave 58 traveling in the opposite direction with respect to sound wave 57. Diffracted beam 27 was downshifted by $f_{RF2}$ resulting in a final frequency of $f_0+f_{RF1}-f_{RF2}$. Similarly, the optical frequency of the returned beam 53 was shifted by both modulators to produce diffracted beam 55 with a frequency of $f_0+2(f_{RF1}-f_{RF2})$. By selecting RF frequencies $f_{RF1}$ and $f_{RF2}$ to be very close, the difference of two frequencies is relatively small. For example, choosing $f_{Rf1}$ and $f_{RF2}$ to be 80.1 and 80 MHz respectively, resulted in a net frequency-shift of 200 KHz which was significantly lower than the RF frequency of either AOM1 or AOM2. This permitted the usage of low frequency amplifiers and demodulation electronics.

FIG. 9 is a diagrammatic view illustrating how the optical and electrical signals can be demodulated to obtain the target vibration frequency and amplitude according to the present invention. The returned light 55 is coupled into laser 1 and mixed with light in the laser cavity 70 to generate a beat signal on the built-in photodetector 2. The electrical current is amplified by transimpedance amplifier 5 to produce signal 71. The signal can be processed by a phased locked loop 73 to decode the time dependent Doppler frequencies. Alternatively, if a single AO modulator is used, a frequency doubling unit 75 can be employed to double the RF signal frequency and an electronic phasemeter 76 can be used to demodulate the signal. The analog signal can then be digitized by a PC computer 13 and processed using a fast Fourier transform to view the vibrational spectrum.

EXPERIMENTAL RESULTS—FIGS. 10–12

Experiments were performed to validate the measurement method with the apparatus shown in FIG. 2 and FIG. 6. For the apparatus shown in FIG. 2, the acousto-optic modulators 25 and 26 (see FIG. 3 and 8 for detail) were operated at 80.1 and 80 MHz respectively. The demodulator for this arrangement operated at 200 KHz. For the apparatus shown in FIG. 6, the single AO modulator 25 was operated at 40 MHz and the demodulator operated at 80 MHz. The test target 7 was a piezo-speaker with brass surface and was located 80 cm away from the laser head. The piezo-speakers' vibration frequency and amplitude were controlled by a sinusoidal frequency generator.

Figure 10A:
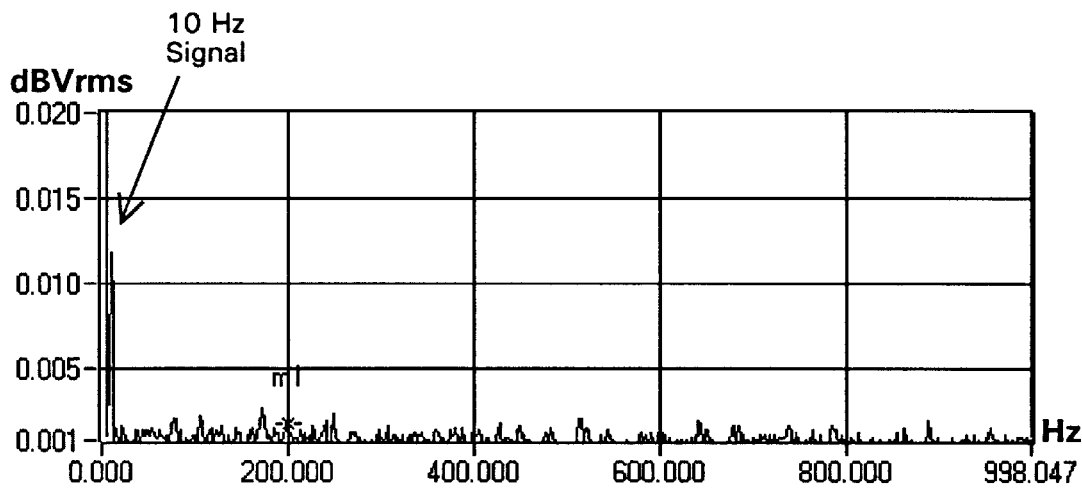
Figure 10B:
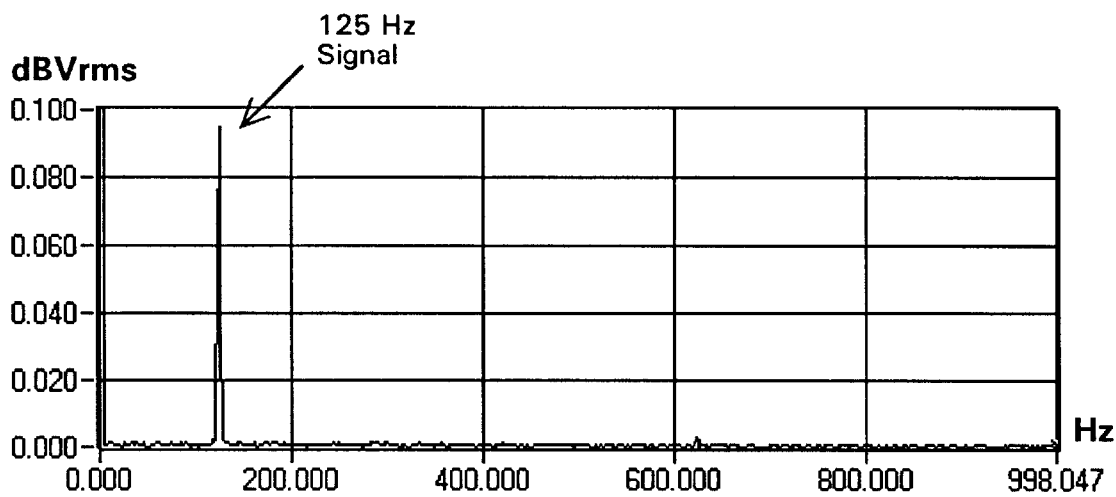
Figure 10C:
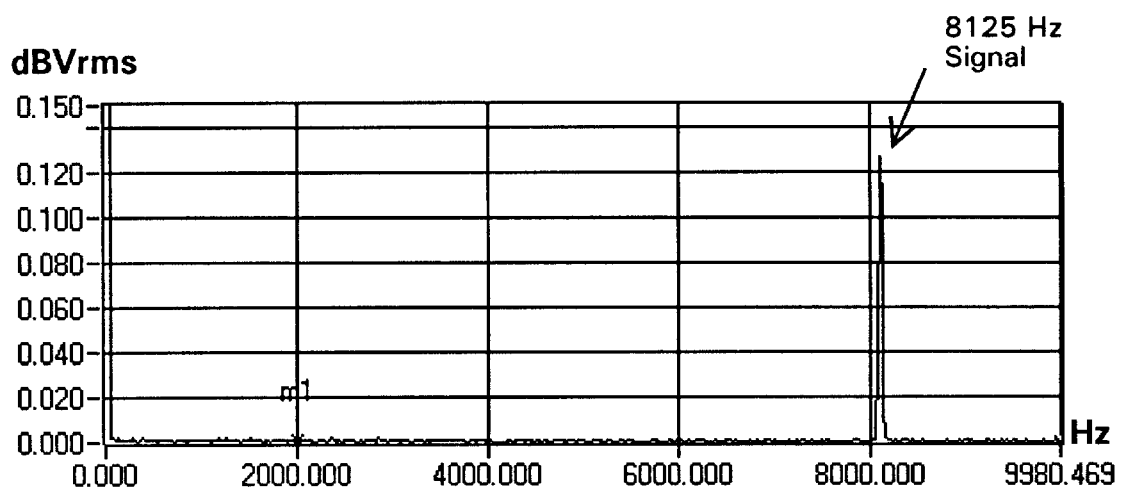

FIG. 10a, b, and c show typical measurement results obtained with the apparatus of FIG. 2 when the object was vibrating at low (10 Hz), medium (125 Hz) and high frequencies (8125 Hz), respectively. These results demonstrate that the vibrometer had a response over a wide vibrational frequency range with a high signal to-noise-ratio.

Figure 11A:
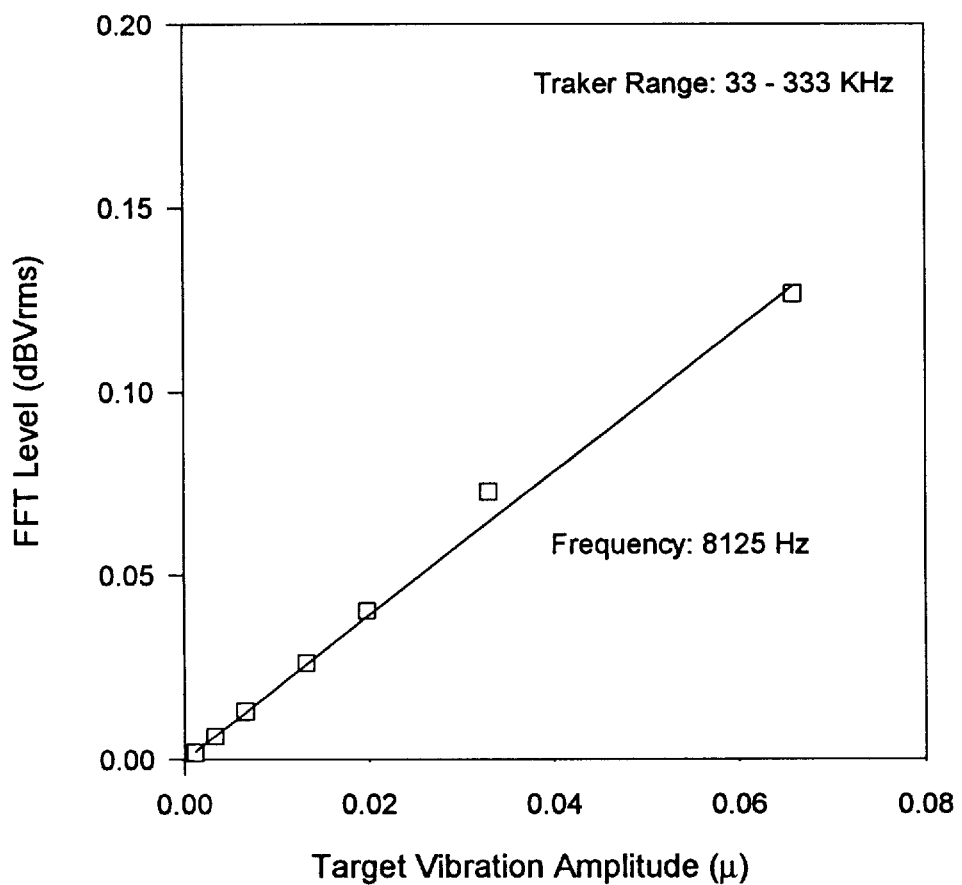
FIG. 11 are measurement results showing the peak power spectrum level obtained with the measurement apparatus of FIG. 2 that employed a 200 Khz frequency shifting element.
Figure 11B:
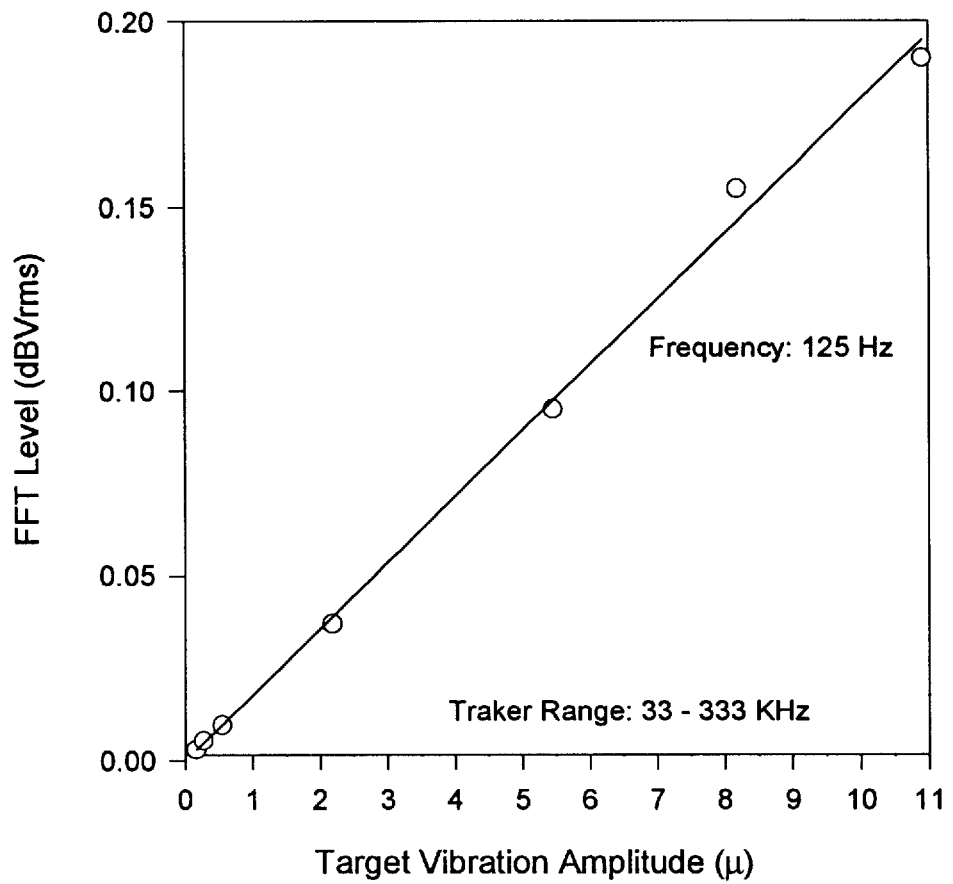

The vibrometer also demonstrated a linear response with respect to object vibration amplitude. FIG. 11a and 11b show typical results for an object driven at frequencies of 125 and 8125 Hz, respectively. These results demonstrate that the vibrometer had a linear response to vibration amplitude over a wide range of vibration frequencies.

The measured sensitivity of the vibrometer, defined as the minimum detectable vibration amplitude for the device, were 0.4 μm at 100 Hz, and better than 0.008 μm at 8000 Hz. The use of higher fidelity amplifiers and demodulation electronics can significantly extend the sensitivity and range of the vibrometer.

Figure 12:
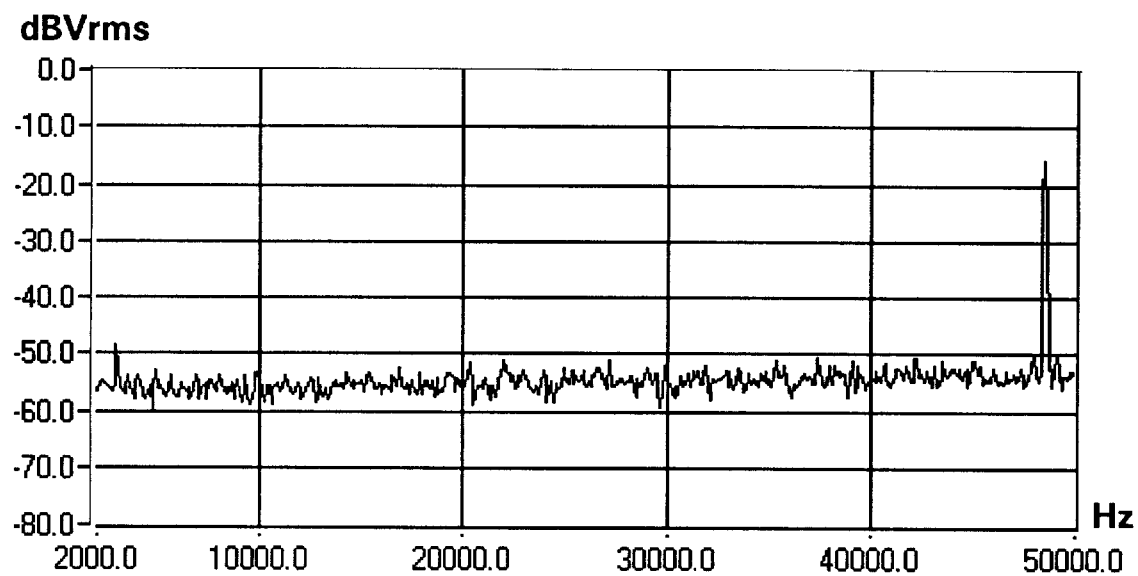
FIG. 12 is a measurement result obtained with the apparatus of FIG. 2 that employed a 40 MHz frequency shifting element.

FIG. 12 shows results obtained with the apparatus of FIG. 6 where a single acousto-optic modulator was operated at 40 MHz and FM demodulation was used to decode the vibration signal from the resulting 80 MHz carrier. Compared with the apparatus of FIG. 2, the system exhibited an improved frequency response of 20 Hz to 80 kHz and a noise floor of −55 db. Further increases in RF carrier frequency will result in similar performance improvements due to the increase in system bandwidth. Improvements to the amplifier and FM detection circuitry will also improve the noise floor and bandwidth.

SUMMARY, RAMIFICATIONS, AND SCOPE

A vibrometer employing a novel combination of a double-pass frequency shifting element and the use of the built-in photodiode to detect the optical heterodyne, FM Doppler signal has been disclosed herein. The external FSE produces a stable, continuous frequency shift that is independent of target position. Because the probe beam, scattered beam, and reference beam all travel down a common axis, proper spatial overlap at the detector is achieved automatically. This configuration reduces the number of necessary optical components over conventional designs, results in an optical system that is easy to align, and permits operation over a long range of distances without the need to readjust the instrument. Significant advantages of the vibrometer according to the present invention over existing commercial vibrometer systems include:

1) Self alignment. Once factory alignments are made, no further alignments are required permitting operation by non-skilled operators.

2) Low-cost. Because of the simple configuration only a minimum number of low cost optical components are necessary.

3) Small size. Because of the few optical components needed the laser head can be very compact and is easily coupled for fiber optic delivery.

4) Long Standoff Range. The self-mixing configuration substantially increases the detection sensitivity to weak return light amplitude and thus permits operation with high F-number optics over a long range of standoff distance (distance between target and laser). The vibrometer can probe targets from 1 cm to 5 m without focusing.

5) High signal fidelity. The FM encoded Doppler signal is insensitive to fluctuations in target reflectivity and has an excellent signal-to-noise ratio.

Although the description above contains many specifications, these should not be construed as limiting the scope of the invention but as merely providing illustrations of some to the presently preferred embodiments of this invention. For example, other radio frequencies and laser wavelengths can be used.

Thus the scope of the invention should be determined by the appended claims and their legal equivalents, rather than by the examples given.

We claim:

1. A system for remotely measuring vibration of an object using a coherent optical beam, said system comprising:
    (a) means for generating a coherent optical beam by a laser, said coherent optical beam having an optical frequency, said laser including a cavity,
    (b) means for modulating the optical frequency of said coherent optical beam with an optical frequency shifting element in a two-pass configuration, thereby yielding a modulating coherent optical beam,
    (c) means for illuminating said object with said modulated coherent optical beam, said object scattering said modulated coherent optical beam to yield a scattered optical beam, said means for modulating the optical frequency of said coherent laser beam further modulating said scattered optical beam,
    (d) means for collecting scattered optical beam from said object,
    (e) means for coupling said scattered optical beam into said cavity of said laser,
    (f) means for creating an optical heterodyne signal by mixing said scattered optical beam with said coherent optical beam in said cavity,
    (g) means for producing an electrical signal in response to said optical heterodyne signal by using a photodetector positioned directly behind said laser,
    (h) means for amplifying said electrical signal using an electronic amplifier, and
    (i) means for processing said amplified electrical signal using an electronic processor to decode a signal proportional to an amplitude and a frequency of the vibration of said object.

2. The system of claim 1 wherein said laser is a diode laser.

3. The system of claim 1 wherein said photodetector is a built in monitor photodiode of a standard diode laser package.

4. The system of claim 1 wherein said optical frequency shifting element is a single acousto-optic modulator.

5. The system of claim 1 wherein said optical frequency shifting element is a dual acousto-optic modulator in which:
    (a) a pair acousto-optic modulators are provided to modulate the optical frequency of said coherent optical beam in a two-pass configuration,
    (b) said acousto-optic modulators operate at different radio frequencies,
    (c) one of said acousto-optic modulators operates to up shift the optical frequency of said coherent optical beam,
    (d) the other of said acousto-optic modulators operates to down shift the optical frequency of said coherent optical beam, and
    (e) a low net modulated frequency of said coherent optical beam is provided by said acousto-optic modulators.

6. The system of claim 1 wherein said electronic amplifier is a broadband transimpedance amplifier.

7. The system of claim 1 wherein said electronic amplifier is a narrow band transimpedance amplifier.

8. The system of claim 1 wherein said means for illuminating said object, said means for collecting scattered optical beam, and said means for coupling said scattered optical beam in said cavity of said laser include a lens element positioned so that all light travels along a single common axis.

9. The system of claim 8 wherein said lens element is a fixed focal length lens.

10. The system of claim 8 wherein said lens element is a variable focal length lens.

11. The system of claim 1 wherein said electronic processor includes a phase locked loop frequency demodulation circuit for decoding said electrical signals.

12. The system of claim 1 wherein said electronic processor includes:
   (a) a frequency doubler to double radio frequency, and
   (b) a fast phase comparator to demodulate said electrical signal.

13. A system for measuring vibration of a target, said system comprising:
   a laser including a laser diode for emitting light at an optical frequency wherein said laser including a laser cavity;
   a modulator positioned between said laser and the target for modulating said light emitted by said laser diode, the target for reflecting said light modulated by said modulator, said light reflected by the target including a Doppler frequency indicative of the vibration of the target;
   said modulator for modulating said light reflected by the target, thereby defining modulated reflected light;
   said laser for:
      receiving said modulated reflected light;
      mixing said light emitted by said laser diode and said modulated reflected light; in said laser cavity and providing a heterodyne signal resulting from said mixing, said heterodyne signal including said Doppler frequency;
   a photodetector for receiving said heterodyne signal from said laser and for providing an electrical signal indicative of said heterodyne signal; and
   a processor connected to said photodetector for receiving said electrical signal and for processing said electrical signal to determine from said Doppler frequency an amplitude and a frequency of the vibration of the target.

14. A system as claimed in claim 13, wherein said light emitted by said laser diode and said modulated reflected light are substantially coaxial.

15. A system as claimed in claim 14, wherein said laser and said photodetector comprise a laser diode package.

16. A system as claimed in claim 13, wherein said processor demodulates said electrical signal to yield a demodulated signal including only said Doppler frequency as a frequency component.

17. A method for measuring vibration of an target, said method comprising the steps of:
   emitting a laser light from a laser source including a laser cavity;
   modulating said emitted laser light with a modulator to define modulated emitted light, said modulated emitted light being incident on the target, the target for reflecting said modulated emitted light to define reflected light which includes a Doppler frequency indicative of the vibration of the target;
   modulating said reflected light with said modulator;
   receiving said modulated reflected light;
   mixing said emitted laser light and said modulated reflected light in said laser cavity to yield a heterodyne signal, said heterodyne signal including said Doppler frequency;
   detecting said heterodyne signal; and
   providing an electrical signal indicative of said heterodyne signal.

18. A method as claimed in claim 17, wherein said emitted laser light and said modulated reflected light are substantially coaxial.

19. A method as claimed in claim 17, further comprising the step of:
   processing said electrical signal to determine from said Doppler frequency an amplitude and a frequency of the vibration of the target.

20. A method as claimed in claim 19, wherein said processing step comprises the steps of:
   demodulating said electrical signal to yield a demodulated signal which includes only said Doppler frequency as a frequency component.

21. A method as claimed in claim 20, wherein said processing step further comprises the steps of:
   determining said Doppler frequency, said Doppler frequency being proportional to a product of the amplitude and the frequency of the vibration of the target.

22. A vibrometer for measuring vibration of a target, said vibrometer comprising:
   a laser apparatus including:
      a laser diode including a laser cavity for emitting light at an optical frequency, the target for reflecting light emitted by said laser diode, said light reflected by the target including a Doppler frequency indicative of the vibration of the target; and
      a photodetector;
   a modulator positioned between said laser apparatus and the target for modulating light emitted by said laser diode and for modulating said light reflected by the target;
   said laser apparatus for receiving said light reflected by the target and for mixing said light from said laser and said light reflected by the target in said laser cavity to produce a heterodyne signal which includes said Doppler frequency; and
   said photodetector for receiving said heterodyne signal and for providing an electrical signal indicative of said heterodyne signal.

23. A vibrometer as claimed in claim 22, wherein said photodetector is connectable to a processor;
   said photodetector for providing said processor with said electrical signal to determine an amplitude and a frequency of the vibration of the target.

* * * * *